United States Patent Office 3,833,646
Patented Sept. 3, 1974

3,833,646
AMMONIUM AROMATIC CARBOXYLATE CONVERSION TO THE CORRESPONDING ACIDS
Richard V. Norton, Wilmington, Del., assignor to Sun Research and Development Co., St. Davids, Pa.
No Drawing. Filed Apr. 16, 1973, Ser. No. 351,219
Int. Cl. C07c 63/14, 63/26, 63/40
U.S. Cl. 260—515 P         8 Claims

ABSTRACT OF THE DISCLOSURE

A process for converting an ammonium salt of an aromatic mono- or dicarboxylic acid to the free acid in high yield by adding acetic acid to a 0.25 to 15 molar aqueous solution of said salt in an amount so that the mole ratio of acetic acid to ammonium ion is greater than about 3:1, and thereafter recovering the free acid.

---

It is known in the art that aromatic dicarboxylic acids may be purified by various treatments of aqueous solutions of their ammonium salts. For example, aqueous solutions of diammonium isophthalate or terephthalate may be treated with hydrogen, hydrogen peroxide, ozone, or $NaBH_4$ to reduce the aldacid or other impurity content or such solutions may be treated with activated charcoal or other adsorbents. Subsequent to such treatment the filtered solution is treated with a strong acid to neutralize the salt and precipitate the purified free acid. Acids frequently used are sulfuric, nitric, hydrochloric and, as pointed out in British Patent 825,375, even a chlorinated acetic acid. Also of interest is U.S. Pat. 3,080,420 which discloses that terephthalic acid is regenerated from its ammonium salt solution by adding the solution slowly with stirring to a solution containing acetic acid in excess of the amount necessary to convert the ammonium terephthalate to terephthalic acid. It will be understood that there is also art where alkali metal salt solutions of aromatic carboxylic acids are precipitated with a strong acid.

It has now been found that purified aromatic mono- or dicarboxylic acid may be obtained in high yield from aqueous ammonium salt solutions using a specific order of addition and specific amount of acetic acid to precipitate the free acid. In accord with the invention, a process is provided for converting an ammonium salt of an aromatic dicarboxylic acid to the free acid in high yield by adding acetic acid to a 0.25 to 15 molar aqueous solution of said salts in an amount so that the mole ratio of acetic acid to ammonium ion is greater than about 3:1, and thereafter recovering the free acid.

The process of the invention enables a highly efficient ammonium salt neutralization of aromatic carboxylic acids and such acids will be selected from the benzene and naphthalene series. Thus, for example, the process of the invention may be employed with the phthalic acids such as phthalic, isophthalic and terephthalic acid and with naphthalene dicarboxylic acids such as 1,5-, 1,4-, 2,6-, 1,10- and 2,5-naphthalene dicarboxylic acid.

The molarity of the ammonium salt solution should be, preferably in general, a molarity of from about 0.25 to about 3 molar. If less than 0.25 molar is used, yields of acid tend to decrease somewhat (see Table IV). However, the molar ratio of acetic acid to ammonium ion concentration is critical to successful operation of the process. Thus, as indicated, the mole ratio of acetic acid to ammonium ion must be greater than about 3:1 and in this way a recovery of well over 90% of acid is achieved. If this ratio is lower than about 3:1, the recovery of acid is significantly lower and the process becomes commercially unattractive. While there appears to be no upper limit to this ratio for operability of the process, practical economics dictate that no more than about 15 moles of acid per mole of ammonium ion be used.

Glacial acetic acid or dilute acid may be used, but dilute acid should be at least about 0.5M. This minimum acid molarity is necessary in order to achieve an acid molarity in the system after acid addition of at least 0.25 which is required to suitably precipitate the dicarboxylic acid.

In carrying out the process, the acid is simply added with agitation to the aqueous diammonium salt solution of the aromatic acid and it is important that acid be added to the salt solution and not the reverse since the reverse order of addition gives product in significantly lower yield. It will be understood that the ammonium salt used may be the mono- or diammonium salt. The free acid precipitates and the pure acid is filtered off or otherwise separated from the liquid. A simple cold water wash of the filter cake is all that is required to remove supernatant acetic acid and yield an acid of high purity.

In order to further illustrate the invention, the experimental data is given in the tables which follow.

GENERAL PROCEDURE

The aromatic dicarboxylic acid was added to 500 cc. of water and standardized ammonium hydroxide solution added to form the mono- or dicarboxylic acid salt as desired. Additional water was then added to bring the solution to the desired molarity.

Glacial acetic acid in various amounts was added dropwise with stirring to the ammonium salt solution and the precipitated acid filtered off, washed with 100 cc. of water, dried, and the amount determined by weight determination.

The data are shown in the following tables:

TABLE I.—DIAMMONIUM ISOPHTHALATE

| (NH₄)₂ iPA* solution | | | | | |
|---|---|---|---|---|---|
| Molarity | Ml. | Moles (NH₄)₂ iPA | CH₃COOH added (moles) | Mole ratio, CH₃COOH/ NH₄⁺ | Recovery of iPA, mole percent |
| 1M | 100 | 0.1 | 0.1 | 0.5 | 26.3 |
|  | 100 | 0.1 | 0.2 | 1.0 | 74.5 |
|  | 100 | 0.1 | 0.4 | 2.0 | 85.5 |
|  | 100 | 0.1 | 0.6 | 3.0 | 94.6 |
|  | 100 | 0.1 | 0.8 | 4.0 | 94.3 |
|  | 100 | 0.1 | 1.0 | 5.0 | 94.9 |
|  | 100 | 0.1 | 2.0 | 10.0 | 93.6 |
|  | 100 | 0.1 | 3.0 | 15.0 | 93.0 |

*iPA=Isophthalic acid.

As can be seen from the above table, only when the mole ratio of acetic acid to ammonium salt is 3.0 or higher is the recovery of free acid significantly high. The acid recovered at these high levels is of very high purity as indicated by its APHA color of 10, low metals content and polymerizability.

TABLE II.—MONOAMMONIUM ISOPHTHALATE

| (NH₄) H iPA* solution | | Moles (NH₄)₂ iPA | CH₃COOH added (moles) | Mole ratio, CH₃COOH/ NH₄⁺ | Recovery of iPA, mole percent |
|---|---|---|---|---|---|
| Molarity | Ml. | | | | |
| 1M | 100 | 0.1 | 0.1 | 1.0 | 73.2 |
|  | 100 | 0.1 | 0.2 | 2.0 | 87.5 |
|  | 100 | 0.1 | 0.3 | 3.0 | 94.3 |
|  | 100 | 0.1 | 0.4 | 4.0 | 94.7 |
|  | 100 | 0.1 | 0.5 | 5.0 | 94.9 |
|  | 100 | 0.1 | 0.6 | 6.0 | 94.7 |

*iPA = Isophthalic acid.

TABLE III.—DIAMMONIUM ISOPHTHALATE

| (NH₄)₂ iPA* solution | | Moles (NH₄)₂ iPA | CH₃COOH added (moles) | Mole ratio, CH₃COOH/ NH₄⁺ | Recovery of iPA, mole percent |
|---|---|---|---|---|---|
| Molarity | Ml. | | | | |
| 0.25 | 100 | 0.025 | 0.2 | 4.0 | 91.3 |
| 0.5 | 100 | 0.05 | 0.4 | 4.0 | 92.1 |
| 1.0 | 100 | 0.1 | 0.8 | 4.0 | 94.7 |
| 1.5 | 100 | 0.15 | 1.2 | 4.0 | 95.3 |
| 2.0 | 100 | 0.20 | 1.6 | 4.0 | 95.8 |

*iPA = Isophthalic acid.

TABLE IV.—DIAMMONIUM TEREPHTHALATE SOLUTIONS

| (NH₄)₂ TPA* solution | | Moles (NH₄)₂ TPA | CH₂COOH added (moles) | Mole ratio, CH₃COOH/ NH₄⁺ | Recovery of TPA, mole percent |
|---|---|---|---|---|---|
| Molarity | Ml. | | | | |
| 1.0 | 100 | 0.1 | 0.2 | 1.0 | 57.5 |
| 1.0 | 100 | 0.1 | 0.7 | 3.5 | 95.7 |
| 1.0 | 100 | 0.1 | 1.0 | 5.0 | 96.1 |
| 0.25 | 100 | 0.025 | 0.175 | 3.5 | 92.5 |
| 0.5 | 100 | 0.05 | 0.35 | 3.5 | 93.4 |
| 1.5 | 100 | 0.15 | 1.05 | 3.5 | 95.9 |

*TPA = Terephthalic acid.

TABLE V.—DIAMMONIUM 2,6-NAPHTHALENEDICARBOXYLATE

| (NH₄)₂ 2,6-NDCA* | | Moles (NH₄)₂ 2,6-NDCA | CH₃COOH added (moles) | Mole ratio, CH₃COOH/ NH₄⁺ | Recovery of TPA, mole percent |
|---|---|---|---|---|---|
| Molarity | Ml. | | | | |
| 0.25 | 100 | 0.025 | 0.1 | 4 | 96.7 |
| 0.5 | 100 | 0.05 | 0.2 | 4 | 97.2 |
| 0.5 | 500 | 0.25 | 1.0 | 4 | 97.5 |

*2,6-NDCA = 2,6-naphthalenedicarboxylic acid.

PRECIPITATION OF ACID FROM NITRILE HYDROLYSATE

A slurry of 0.5 mole of terephthalonitrile in 1 liter of deionized water reacted at 250° C. for 2 hours in a stainless steel reactor. After the hydrolysis was complete the reactor was cooled to 50° C. and the amber colored liquid divided into four 250 ml. portions. The portions were treated with 0.3 g. of activated carbon at 100° C., filtered to remove the carbon and acidified by the addition of glacial acetic acid. The data is shown in the following table:

TABLE VI

| Molarity | Moles CH₃COOH added | Mole ratio CH₃COOH/ CN, hydrolysis products | TPA recovered, mole percent | Iron iic product and (p.p.m.) |
|---|---|---|---|---|
| 1 | 0.5 | 0.25 | 1.0 | 73.2 | 900 |
| 2 | 0.5 | 0.75 | 3.0 | 95.1 | 400 |
| 3 | 0.5 | 1.37 | 5.5 | 96.3 | 300 |
| 4 ª | 0.5 | 0.87 | 3.5 | 94.7 | 1,700 |

ª In this experiment the hydrolysate was added to the acetic acid in reverse order.

The invention claimed is:

1. A process for converting the ammonium salt of an aromatic dicarboxylic acid of the benzene and naphthalene series to the corresponding free acid which comprises adding acetic acid to 0.5 to 15 molar aqueous solution of said salt in an amount equivalent to at least about 3 moles of acid per mole of ammonium ion and thereafter recovering the precipitated solid free acid.

2. The process of Claim 1 where the aromatic acid is a member of the benzene series.

3. The process of Claim 2 where the aromatic acid is isophthalic acid.

4. The process of Claim 2 where the aromatic acid is terephthalic acid.

5. The process of Claim 1 where the aromatic acid is a member of the naphthalene series.

6. The process of Claim 5 where the aromatic acid is 2,6-naphthalenedicarboxylic acid.

7. The process of Claim 1 where the ammonium salt is obtained by hydrolysis of the corresponding aromatic dinitrile.

8. The process of Claim 7 where the nitrile hydrolyzed is terephthalonitrile.

References Cited

UNITED STATES PATENTS

| 3,080,421 | 3/1963 | Ringwald | 260—524 |
| 3,243,456 | 3/1966 | Caldwell et al. | 260—525 |
| 3,247,246 | 4/1966 | Fragen | 260—515 |

JAMES A. PATTEN, Primary Examiner